Oct. 28, 1958    J. R. OISHEI ET AL    2,857,611
WINDSHIELD CLEANER
Filed April 30, 1956    4 Sheets-Sheet 1
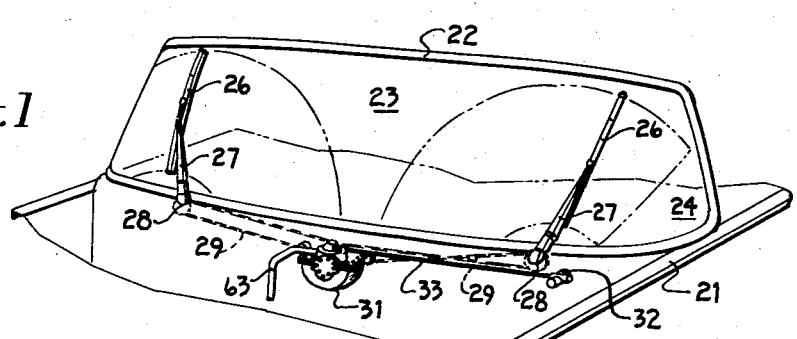
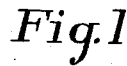
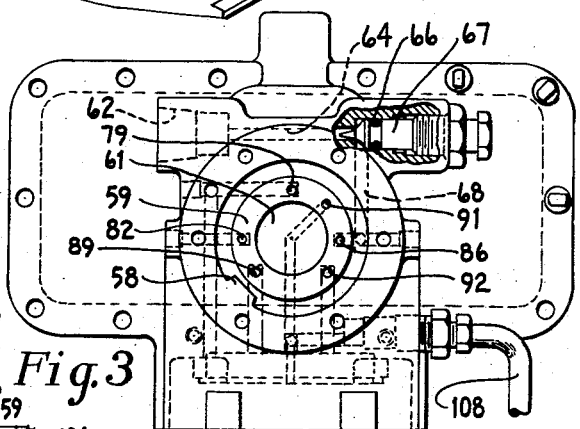
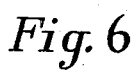
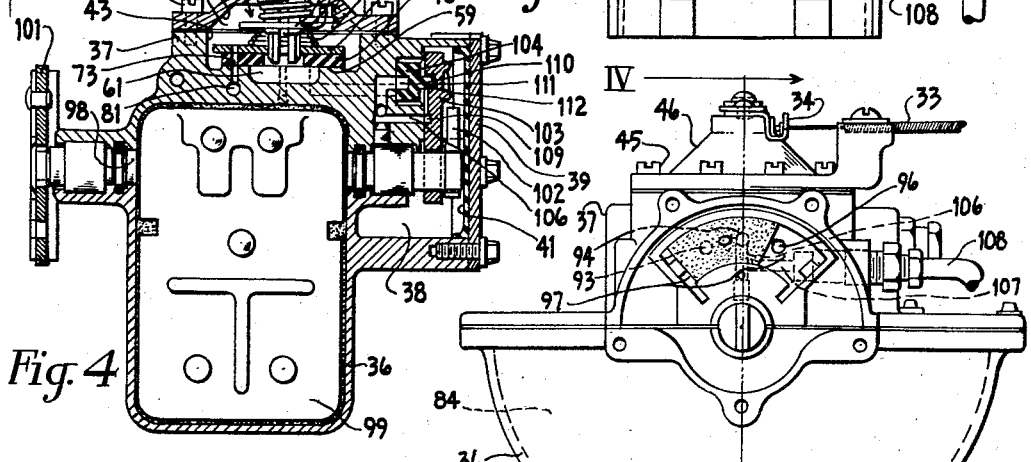
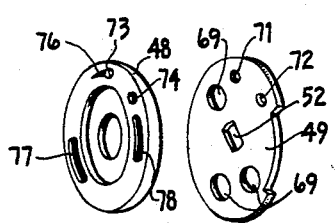
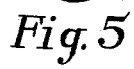
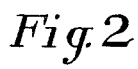
INVENTOR.
John R. Oishei and
BY Martin Bitzer
Bean Brooks Buckley & Bean
ATTORNEYS Oct. 28, 1958 J. R. OISHEI ET AL 2,857,611
WINDSHIELD CLEANER
Filed April 30, 1956 4 Sheets-Sheet 2

INVENTOR.
John R. Oishei and
BY Martin Bitzer

Bean Brooks Buckley & Bean
ATTORNEYS

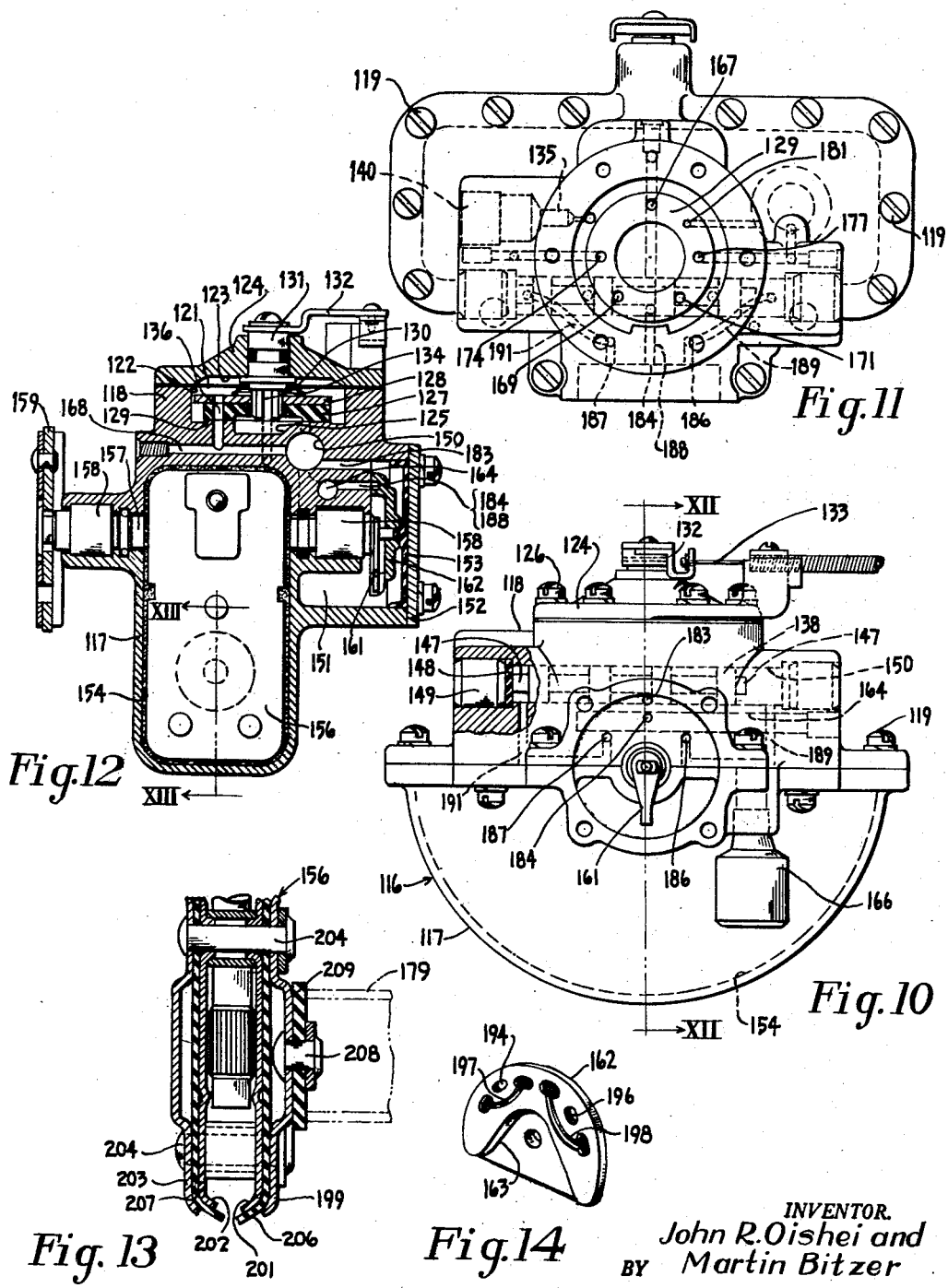

Oct. 28, 1958     J. R. OISHEI ET AL     2,857,611
WINDSHIELD CLEANER

Filed April 30, 1956                       4 Sheets-Sheet 4

INVENTOR.
John R. Oishei and
BY   Martin Bitzer

Bean Brooks Buckley + Bean
ATTORNEYS

United States Patent Office 2,857,611
Patented Oct. 28, 1958

2,857,611

WINDSHIELD CLEANER

John R. Oishei, Buffalo, and Martin Bitzer, Kenmore, N. Y., assignors to Trico Products Corporation, Buffalo, N. Y.

Application April 30, 1956, Serial No. 581,758

18 Claims. (Cl. 15—253)

This invention relates to windshield wipers, and more particularly to a windshield wiper powered by pressurized fluid medium.

The advent of the wraparound, or panoramic, type of windshield in the motor vehicle field, has created new problems related to the effective cleaning, or wiping thereof. Among other things, longer and stronger wiper blades and arms are required to wipe the increased visual areas afforded by the lateral areas which are formed integral with the frontal area in such type of windshield. A greater load has thus been placed upon the wiper motor, making it desirable to increase the torque output of the wiper motor accordingly. In the case of the usual vacuum powered wiper motor, which is generally connected to the engine intake manifold, such increased torque may be attained by either an increase in wiper motor size, which is limited by the volumetric displaceability of the available vacuum source, and/or space conditions under the vehicle hood or instrument panel, or by the capacity of a superseding or supplementary vacuum source, such as an engine driven vacuum pump. In addition, load demand on wiper motors may be further increased by the anticipated use of a three, or more, wiper blade system, as standard equipment on the motor vehicles of tomorrow.

It has heretofore been proposed to operate windshield cleaners by superatmospheric pressure in order to provide the desired higher torque output. However, where the wipers are parked by such relatively heavy pressure, it is possible to have the rubber wiping edge become deformed through the constant application of the superatmospheric pressure as it holds the wiping blade down upon the windshield molding during periods of idleness of the windshield cleaning mechanism.

The primary object of the present invention is to provide a compressed air-operated windshield cleaner wherein pressurized means are provided to move the wipers to their parked position against the windshield frame and thereafter the pressure is removed to relieve the wiping blades from the influence of such heavy pressure medium.

The present invention contemplates the provision of a windshield wiping mechanism having a torque output adequate for use on a panoramic type of windshield with a motor which may be smaller than the conventional type vacuum operated wiper motor. A compressed air power source as now used on vehicles having air-brakes, air-cushioned ride control equipment, or other compressed air operated accessories, serves as the power source of the wiper motor of the invention. Two embodiments utilizing the principles of the invention are disclosed; in one of the embodiments an adjusting means is provided to regulate the torque output of the motor so that the latter may be adjusted to meet load demand on any particular installation. In both embodiments, an integral control valve, which regulates admission of pressurized medium to the motor, is partially pressure balanced to provide operation with minimum effort, or friction.

An object of the invention is to provide an improved windshield wiper system that is powered by a pressurized fluid medium and wherein its wiper is parked in a manner to relieve the wiper and other parts of the system from possible injury resulting from a constant application of super-atmospheric pressure during periods of idleness.

A further object is to provide a windshield wiper motor that is relatively small in size, and which has a high torque output.

Still another object is to provide a windshield wiper motor with an integral, partially pressure-balanced control valve that may be operated with minimum effort, or friction.

These and further objects and features of the invention will become more apparent from the following description and accompanying drawings wherein;

Fig. 1 is a fragmentary perspective view of a motor vehicle having a wiper motor of the invention;

Fig. 2 is a side view of said wiper motor with certain elements removed;

Fig. 3 is a plan view of said wiper motor with a cap removed;

Fig. 4 is a section view as seen from line IV—IV in Fig. 2;

Fig. 5 is a perspective view of the control valve used in the wiper motor of Fig. 1;

Fig. 6 is a perspective view of a sealing cup used in said wiper motor;

Fig. 10 is a side view in partial section, of a modified form of the wiper motor embodying the principles of the invention, with certain elements removed;

Fig. 11 is a plan view of the wiper motor of Fig. 10, with certain elements removed;

Fig. 12 is a section view as seen from line XII—XII in Fig. 10;

Fig. 13 is a section view as seen from line XIII—XIII in Fig. 12;

Fig. 14 is a perspective view of a valve used in the wiper motor of Fig. 10.

Figure 7:
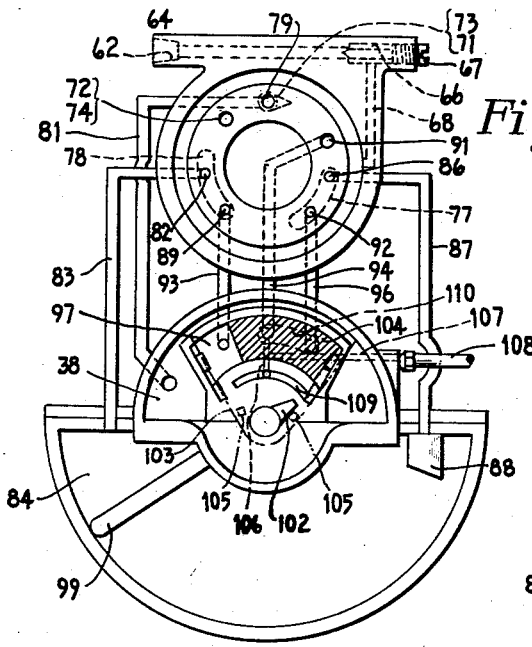
Figs. 7, 8 and 9 are schematic illustrations of said wiper motor showing the relative position of certain elements during, motor operation, motor parking, and motor parked condition respectively.

Referring now to the drawings and more particularly to Figs. 1 to 6, numeral 21 identifies a motor vehicle having a windshield 22 of the panoramic, or wraparound type, consisting of a relatively flat frontal area 23, and side, or lateral areas 24 joined thereto at a relatively sharp angle. One or more wiper blades 26 are each supported on a wiper arm 27 for oscillatory movement upon the windshield for wiping discrete areas thereof, said wiper arm being mounted upon a shaft 28, which is connected by flexible means, such as cables 29, to a wiper motor 31. A motor control knob 32, positioned in the vehicle for convenient manipulation by the vehicle operator, connects with one end of a Bowden wire 33, the other end of the latter being connected to a control valve arm 34 of the wiper motor for the operational control of the latter.

The wiper motor 31 includes a piston chamber housing 36, and a cover housing 37, affixed to the top of the chamber housing, both housings being arranged to provide an open-sided valve chamber 38 formed on one side of the wiper motor, as best seen in Fig. 4. A cover plate 39, enclosing the open side of the valve chamber 38, affords support to a flexible sealing cup 41, which is preferably formed from a rubber-like material, and which has an integral flange extending about its edge and engaging an inside end portion of the chamber 38. It will be seen that when pressurized fluid medium, such as compressed air, is introduced into the chamber 38, the flange of sealing cup 41 will be maintained in tight engagement against the side walls toward the end of chamber 38, to provide an air-tight sealing of the chamber.

A control valve assembly 47, is positioned in a control valve chamber 42 defined by a cavity 43, formed in the cover housing 37, and a cavity 44, formed in a cap 46 removably affixed to the cover housing, such as by screws 45. The control valve assembly includes a control valve 48, preferably formed of a rubber-like material, a metallic control valve disc 49 mounted atop the valve 48, a control valve shaft 51 rotatably supported in the cap 46 and extending downwardly to enter a hole 52 formed in the disc 49, a spring retainer 53 affixed to the shaft 51 for rotation therewith, a torsion spring 54, one end of which enters a slot 56 formed in the shaft, the other end of which abuts the spring retainer, and a conical spring 57 compressively arranged between the spring retainer and the valve disc. The end of the torsion spring 54 projects radially beyond the end of the spring retainer for engagement with a lug 58, formed integral with the cap 46 and projecting into the cavity 44, the purpose for which will be presently explained. Arm 34 is secured to the end of control valve shaft 51 for the rotational positioning of the shaft.

The control valve 48 seats upon a circular valve head 59, the inner area of which has a recess 61 maintained in communication with control valve chamber 42 by virtue of the slot 56 formed in the shaft 51. In such manner, air pressure in valve chamber 42 can act upon a portion of the underside of the control valve 48 to balance the air pressure being exerted upon the opposite area of the valve, to thus reduce seating pressure so that the control valve can be easily rotated upon its seat. Conical spring 57 is of such strength as to assure that the control valve will remain seated under all conditions of operation, particularly if air pressure should be absent in the valve chamber 42.

A threaded recess 62 is provided in the cover housing for reception of a compressed air hose 63, the other end of said hose being connected to a compressed air source such as an engine driven compressor, or compressed air storage tank (not shown). Leading from the recess 62 is a passageway 64 which opens at the other end into a needle valve chamber 66, having a needle valve 67 that is threadably adjusted to regulate the rate of air flow into the needle valve chamber. A passageway 68 leading from the needle valve 66, opens into the control chamber 42 just adjacent to the valve head 59.

The control valve 48 has three circular protrusions (not shown) on its upper surface, which enter into three holes 69 formed in the valve disc 49, for maintaining the disc in registry with the valve. Holes 71 and 72 are formed in the valve disc in alignment with holes 73 and 74 respectively formed in the control valve 48. Hole 73 has a depending tear-shaped groove 76 formed on the lower surface of the control valve whereby the rate of air flow to the piston chamber may be regulated, as will be more apparent hereinafter. Two kidney-shaped grooves 77 and 78 are formed on the lower surface of the control valve 48. Formed in the valve head 59 are a plurality of portholes connecting with passageways as follows: porthole 79 and associated passageway 81 leading to and opening into the valve chamber 38; porthole 82 and associated passageway 83 leading to and opening into one end of a piston chamber 84 formed in the piston chamber housing 36; porthole 86 and associated passageway 87 leading to and opening into a piston stop, or parking chamber 88 positioned in the opposite end of the piston chamber; and portholes 89, 91, and 92, and associated passageways 93, 94, and 96 respectively, each of which leads to and opens into a distributing valve chamber 97 in the form of a sector of an annulus, and having an open side facing the valve chamber 38.

The valve operating mechanism in this chamber 97 is more fully described and claimed in copending application Serial No. 565,857, now Patent No. 2,803,225, the same comprising a piston shaft 98, supported near each end by bearing means formed in the housings 36 and 37, said shaft being drivingly connected to a motor piston 99, arranged for oscillating movement in the piston chamber 84. On the outer end of the shaft 98, is a cable connecting means 101, while on the inner end of the shaft is mounted an arm member 102. A shuttle, or lever 103, rotatably supported upon the end of the shaft and seated against the open side of distributing valve chamber 97, has arcuately spaced stops 105 positioned for alternate engagement by the arm member 102 near the end of its stroke as it oscillates with the motor shaft 98. The lever 103 has an arcuate width slightly less than the arcuate width of distributing valve chamber 97, so that each end of the latter is alternately exposed to the pressure existing in the valve chamber 38. Slidably positioned within the distributing valve chamber 97, is a distributing valve 104 which is preferably made of resilient material, and which is arranged to act as a free floating piston responsive to pressure differential created between its ends to cause oscillatory movement thereof. On the inner surface of the valve 104 is formed a kidney-shaped groove 110 of such length as to bridge the open ends of passageway 94 with either passageway 93 or 96, depending upon the position of the valve within the valve chamber 97. A passageway 106 having an opening on the surface engaged by the lever 103, is connected to the passageway 94, while a passageway 107 connects passageway 106 to atmosphere via conduit 108. A circular groove 109, formed on the inner surface of the lever 103 is of such length as to connect the end of passageway 106 with that end of the distributing valve chamber 97 toward which the lever 103 has been moved. It will be seen that the arrangement of the distributing valve is such that as one end thereof is exposed to the pressure in valve chamber 38, the opposite end thereof will be exposed to atmosphere.

The operation of the motor can now be described.

Assume that the wiper motor is connected to a source of compressed air, which is conducted to the control valve chamber 42 via passageway 64, needle valve chamber 66, and passageway 68, and that the operator has turned the control knob 32 so that the Bowden wire 33 pushes the arm 34 to rotate the shaft 51 clockwise (as viewed from top of motor). As best seen in Fig. 7, certain holes and grooves in the control valve 48, will be placed over certain holes in the valve head 59 as follows: hole 73 over porthole 79; groove 78 bridging portholes 82 and 89; and groove 77 bridging portholes 86 and 92. In the illustrated position of the distributing valve 104, compressed air will flow from the control valve chamber 42 through porthole 79 and through passageway 81 into the valve chamber 38, through passageway 93 and out porthole 89, into groove 78, then into porthole 82 and passageway 83 to the left side of the piston chamber 84. At the same time, the right side of the piston chamber will be open to atmosphere via parking chamber 88, passageway 87, porthole 86, groove 77, porthole 92, passageway 96, kidney-shaped groove 110, passageways 94 and 107, and conduit 108. The pressure differential thus created on opposite sides of the motor piston will cause the latter to move counter-clockwise, as indicated, in the piston chamber to provide output torque on the motor shaft 98.

As the motor piston approaches the end of its counter-clockwise movement, the arm member 102 will engage the stop 105 left of center, and shift the lever 103 counter-clockwise. In such position of the lever 103, the right side of the distributing valve chamber 97 will be uncovered thus exposing the end of the distributing valve 104 to the compressed air in chamber 38, and at the same time exposing the opposite end of the distributing valve to atmosphere via circular groove 109, and passageways 106 and 107, to conduit 108. The pressure differential thus created between the ends of the distributing valve 104, will rapidly shift the latter in a counter-clockwise direction, to the other end of the distributing valve chamber. In such position of the distributing valve, compressed air in valve chamber 38 will be conducted to the right side of the piston chamber 84 via passageway 96, porthole 92, groove 77, porthole 86, passageway 87, and parking chamber 88. Simultaneusly, the left side of the piston chamber will be exposed to atmosphere via passageway 83, porthole 82, groove 78, porthole 89, passageway 93, kidney-shaped groove 110, passageways 94 and 107, and conduit 108. The pressure differential thus created between opposite sides of the motor piston 99, will cause it to move clockwise in the piston chamber. Such movement will continue until the piston approaches end of stroke, whereupon the arm 102 will engage the stop 105 right of center to shift the lever 103 clockwise, whereupon the various passageway connections will be established to provide movement of the piston, as first described. The motor will operate i. e., the piston will oscillate in the piston chamber according to the foregoing description, as long as the control valve is in the Fig. 7 position.

Figure 8:
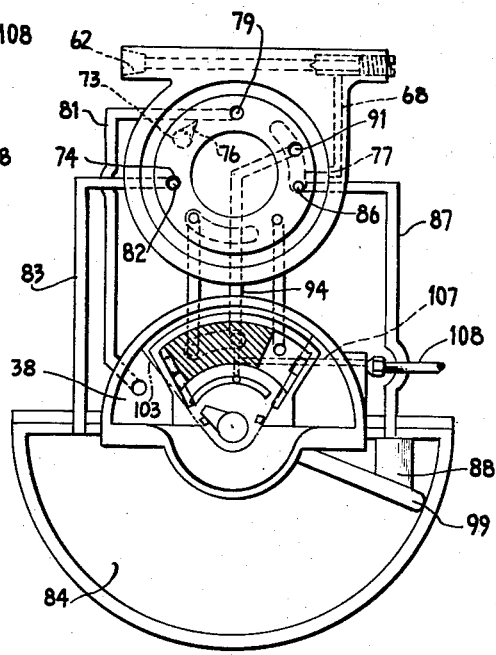

The position of the control valve 48 during parking, is illustrated in Fig. 8. The motor vehicle operator by turning the control knob in the direction opposite to that for motor operation, causes the control valve arm 34 to turn the control valve shaft counter-clockwise (as viewed from top of motor), so that the valve hole 74 is brought into alignment with porthole 82, whereupon compressed air in control valve chamber 42, passes through passageway 83 into the left side of the piston chamber 84. At the same time, the groove 77 interconnects portholes 86 and 91, so that the right side of the piston chamber is exposed to atmosphere via parking chamber 88, passageway 87, passageways 94 and 107, to conduit 108. As a result, pressure differential on the motor piston causes the latter to be moved into seated engagement with the bottom edge of the parking chamber 88. Since the valve chamber 38 will no longer be exposed to pressure fluid from the control valve chamber 42, because the porthole 79 will be covered by the control valve 48, there will be no pressure differential built up on the ends of the distributing valve 104, hence the latter will remain in its counter-clockwise position as shown in Fig. 8.

Figure 9:
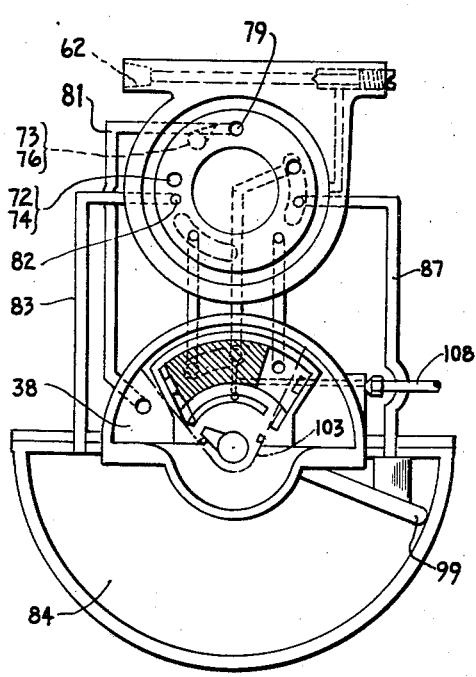

As the control valve is shifted to the Fig. 8 position, the free end of torsion spring 54 will engage the lug 58, whereby the spring will be further compressed; as soon as the vehicle operator releases the control knob 32, the spring 54 acting against the lug 58, will rotate the control valve 48 clockwise to the Fig. 9, or parked position. In this position, it will be seen that the valve holes 73, 74 will be out of alignment with the portholes 79, 82 of passageways 81, 83 respectively, so that compressed air is cut off from admittance to either valve chamber 38, or the piston chamber. Accordingly, no pressure differential will exist between the sides of the piston 99, hence it will remain in parked condition due to frictional resistance, and/or the weight of the wiper super-structure as transmitted to the wiper motor by the cables 29. It may be noted that since there is no pressure differential in the piston chamber when the motor is in parked condition, the parking chamber 88 serves no purpose other than to form an abutment for the piston; accordingly, there is no absolute need for an air tight seal between the side of the piston and the bottom edge of the parking chamber when the piston is in parked condition. It may be further noted that where the wiper shaft is pivoted at the top of the windshield, as in certain commercial vehicles, the wiper arm can be locked in parked position by a spring catch, or detent, where it will remain until released by action of the wiper motor when it is first turned on.

To assure that the distributing valve 104 will be moved and remain in the left of center position (Fig. 9), so that motor starting will take place when the control valve is rotated to motor operating position (Fig. 7), a small projection 111 is formed on the surface of the distributing valve 104, opposite to the surface having the groove 110, which projection extends into a circular groove 112 formed on the inside surface of the lever 103. The arcuate length of the groove 112 is such as not to engage the projection during motor operation, but will engage said projection as the lever 103 is moved into extreme counter-clockwise position, which occurs only during motor parking.

A modification of the wiper motor above described, which embodies the principles of the invention, is illustrated in Figs. 10 through 17.

Referring more particularly to Figs. 10 through 14, numeral 116 identifies a wiper motor having a piston chamber housing 117, and a cover housing 118 removably affixed to the piston chamber housing by fastening means, such as screws 119. A control valve chamber 121, arranged in the upper part of the wiper motor, is formed by cavities 122 and 123, provided in the cover housing 118 and a cap 124 respectively. The latter is removably secured to the cover housing by fastening means, such as screws 126. A circular control valve 127, preferably formed from a rubber-like material, and having a metallic disc 128 mounted on top, is arranged in the valve chamber 121. The valve 127 is rotatable upon a circular valve seat 129, by means of a control valve shaft 131 supported in the cap 124. The inner area of the valve seat 129 is recessed to form a cavity 125 that is in communication with valve chamber 121, by way of an axial slot 130, formed in the control valve shaft 131 toward the lower end thereof. The shaft 131 extends through the center of the valve disc 128 and valve 127, and is arranged for the rotational positioning of the control valve.

An arm 132, having one end affixed to the shaft 131, is arranged for connection at the other end by a Bowden wire 133, that is movable by a control knob (not shown), located in a convenient position in the vehicle for manipulation by the vehicle operator. A conical spring 134 is compressively arranged between the disc 128 and a hub formed on the shaft 131, to assist in maintaining the valve 127 upon the valve seat 129.

A threaded recess 140 is arranged to receive a hose, or conduit (not shown), which connects the motor to a source of pressurized fluid medium, such as compressed air, supplied by a compressor operated by the vehicle engine, or a compressed air storage tank carried by the vehicle. A passageway 135 leads from the recess 140 and opens into the control valve chamber 121 adjacent the outer periphery of valve seat 129, to thus conduct compressed air to the control valve chamber. It will be seen that the air pressure acting on top of the valve disc 128, is partially balanced by the air pressure in cavity 125 acting upwardly on the control valve 127, to thereby reduce the force of contact pressure between the latter and the valve head 129.

Holes 136 and 137 extend through the control valve 127 and disc 128, and serve to connect the control valve chamber 121 with certain passageways formed in the motor for the flow of compressed air to the motor during operation thereof. A tear-shaped groove 145 formed on the bottom of the valve and extending from the edge of hole 136, provides air flow admission control for motor speed regulation. A horizontal valve chamber 150 is located in the cover housing 118, and contains a spool valve 138 slidably arranged therein, said valve having end projections 147, and four pistons 139 defining volumes 141, 142, 143, 144 and 146, volumes 141 and 146 being variable in size depending upon the location of the valve in the valve chamber. The valve end projections 147 alternately engage a solid rubber-like washer 148 positioned at each end of the valve chamber adjacent a valve plug 149, which washers serve as buffers for the valve at end of stroke.

A valve chamber 151, formed by the piston chamber housing 117 and the cover housing 118, has an open side which is covered by a cover plate 152. A sealing cup 153, having a flanged edge and positioned in the valve chamber 151, adjacent to the cover plate 152, serves to seal the valve chamber when air pressure therein forces the flange of the cup in snug engagement with the side walls toward one end of the valve chamber. Arranged for oscillating movement in a piston chamber 154, is a vane-like piston 156 which is operatively connected near its upper end to a piston shaft 157, the latter of which is rotatably supported near each end on bearings 158 journalled in the housings 117 and 118. A cable attachment means 159 is affixed to the outer end of the piston shaft, while an arm member 161 is affixed to the opposite end of the piston shaft for rotary movement therewith. Rotatably supported upon the end of the piston shaft in the valve chamber 151, is a shuttle, or disc valve 162 having an angular recess 163 on its inner side, which recess encloses the arm member 161. It will be seen that as the arm member reciprocates through a given angle with the piston shaft 157, it will alternately engage each side of the recess 163, to provide oscillatory movement to the disc valve.

An exhaust chamber 164, one end of which is open to atmosphere via an exhaust muffler 166, is formed in the housing 118. A plurality of portholes arranged on the valve seat 129, have depending passageways adapted to establish certain pneumatic circuits through the motor, as follows: porthole 167 and associated passageway 168 which leads to and opens into the valve chamber 150 in the region of volume 143; portholes 169 and 171 and associated passageways 172 and 173 respectively, which lead to and open into the valve chamber 150; porthole 174 and associated passageway 176 which leads to and opens into the left side of the piston chamber 154; porthole 177 and associated passageway 178 which leads to and opens into a parking chamber 179 located at the right side of the piston chamber 154; and porthole 181 and associated passageway 182 which leads to and opens to the atmosphere. A passageway 183 connects the midportion of valve chamber 150, in the region of volume 143, with the valve chamber 151. A pair of kidney-shaped grooves 180 and 185 are formed in spaced relationship on the bottom of control valve 127; groove 180 is arranged to bridge either portholes 171 and 177, or 177 and 181, while groove 185 is arranged to bridge portholes 169 and 174.

On a vertical surface of the valve chamber 151 engaged by disc valve 162, are three portholes 184, 186 and 187, having associated passageways 188, 189 and 191 respectively, all of which lead to and open into the exhaust chamber 164, the first in the region of volume 143, the second in the region of volume 141, and the third in the region of volume 146. Passageways 192 and 193 connect the exhaust chamber 164 with the valve chamber 150 in the region of volume 142 and 144 respectively.

The disc valve 162 has two holes 194 and 196, which are adapted for alternate alignment with portholes 186 and 187 respectively, as the disc valve is rotatably shifted by action of the arm member 161, to thereby connect the interior of valve chamber 151 with volume 141 or 146. On the inner surface of the valve 162 are two kidney-shaped grooves 197 and 198, the former of which is arranged to bridge portholes 184 and 186 in one angular position of the disc valve, the latter of which is arranged to bridge portholes 184 and 187 in another angular position of the disc valve, as seen in Figs. 16 and 15 respectively.

The piston 156 is composed of four plate members 199, 201, 202 and 203, held together by fastening means such as rivets 204, and has a pair of flexible sealing gaskets 206 and 207, preferably formed of a resilient material which gaskets are sandwiched between plates 199, 201, and 202, 203 respectively. The sealing gaskets project slightly beyond the plates for sliding engagement with the walls of the piston chamber 154, and are adapted to prevent escape of compressed air past the piston during motor operation, but which will allow slow air flow past the piston when the motor is parked. Mounted upon the outside of the plate member 199 by fastening means, such as rivet 208, is a flexible washer 209 which is arranged to engage the edges of parking chamber 179 when the motor is in parked condition. The washer 209 serves to hold the piston 156 in engagement with the parking chamber during prolonged periods of motor parking, because as the compressed air seeps past the parked piston, it will act upon the undersurface of the washer, that is, the surface adjacent piston plate 199, to thereby hold the washer in snug engagement with the edge of the parking chamber. In such manner, the piston 156 is pressure balanced during prolonged periods of wiper motor parking. The operation of the motor will now be described.

Figure 15:
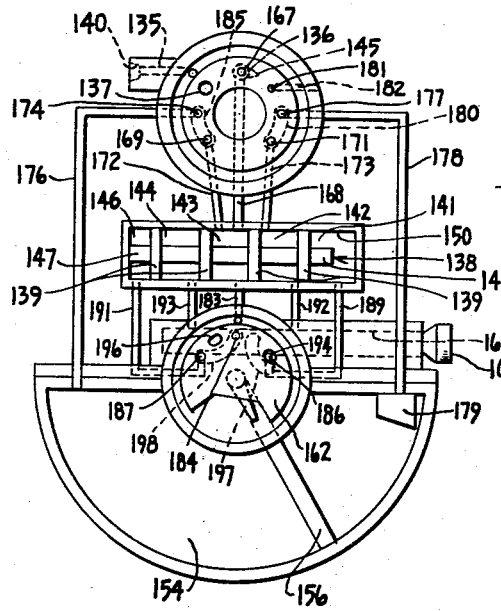
Figs. 15, 16 and 17 are schematic illustrations of the wiper motor of Fig. 10 showing the relative positions of certain elements during, counter-clockwise piston movement, clockwise piston movement, and motor parked condition respectively.

Assume that the motor is connected to a source of compressed air whereby air flow will occur through passageway 135 into the control valve chamber 121, and that the vehicle operator has turned the control knob so that the Bowden wire 133 has rotated the arm 132 to position the control valve as shown in Fig. 15. In this position of the control valve, compressed air will flow through valve hole 136, into valve chamber volume 143 via passageway 168, from whence it will flow into passageway 188, and valve chamber 151, and also into the left side of the piston chamber 154 via passageway 172, porthole 169, groove 185, porthole 174 and passageway 176, to act upon one side of the piston 156. The right side of the piston chamber will be open to atmosphere via parking chamber 179, passageway 178, porthole 177, groove 180, porthole 171, passageway 173, valve chamber volume 142, passageway 192, exhaust chamber 164, and exhaust muffler 166. The pressure differential thus created upon opposite sides of the piston 156 will cause it to swing in a counter-clockwise direction (Fig. 15). During this phase of motor operation, the disc valve 162 will be positioned to admit compressed air from valve chamber 151 to volume 141, via valve hole 194, porthole 186, and passageway 189, and to expose volume 146 to atmosphere, via passageway 191, porthole 187, groove 198, porthole 184, passageway 188, exhaust chamber 164, and exhaust muffler 166. The pressure differential thus created between the end pistons 139 of the spool valve 138, will maintain the latter toward the left end of the valve chamber 150 (Fig. 15).

Figure 16:
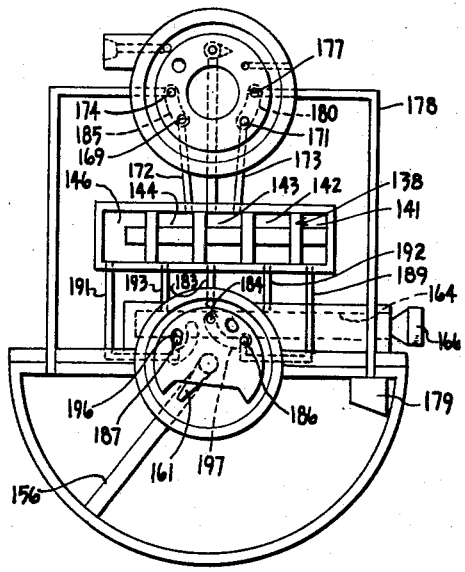
Figure 17:
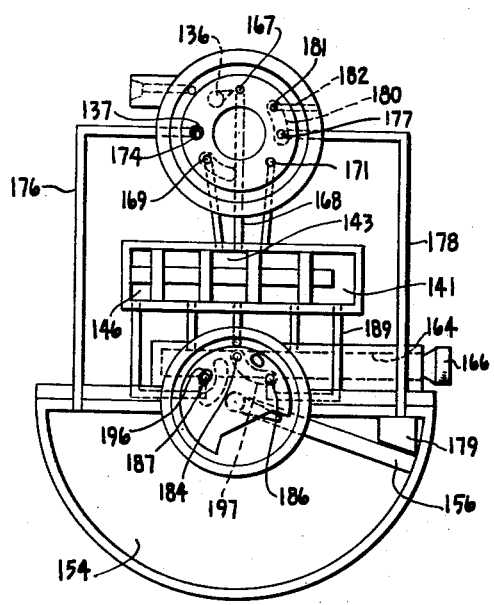

As the piston approaches the end of its counter-clockwise movement, the arm member 161 will engage the edge of the disc valve recess 163 to rotatably shift the latter to the position illustrated in Fig. 16. In this position of the disc valve, compressed air from valve chamber 151 will be conducted to volume 146 via valve hole 196, porthole 187, and passageway 191, while volume 141 will be exposed to atmosphere via passageway 189, porthole 186, groove 197, porthole 184, passageway 188, exhaust chamber 164, and exhaust muffler 166. The pressure differential thus created between opposite ends of the spool valve 138, will cause it to shift toward the right end of the valve chamber 137 (Fig. 16). In this position of the valve, compressed air will be conducted from volume 143, to the right side of the piston chamber 154, via passageway 173, porthole 171, groove 180, porthole 177, passageway 178, and parking chamber 179, while the left side of the piston chamber will be exposed to atmosphere via passageway 176, porthole 174, groove 185, porthole 169, passageway 172, volume 144, passageway 193, exhaust chamber 164, and exhaust muffler 166. The pressure differential thus created between opposite sides of the piston 156, will cause the latter to swing clockwise in the piston chamber. Such movement of the piston will continue until the arm member 161 engages the other edge of the disc valve recess 163, to rotate the valve 162 to the Fig. 15 position, whereupon the spool valve will be shifted toward the left end of the valve chamber 150, to set the pneumatic circuits as heretofore explained, for counter-clockwise movement of the piston.

Oscillatory movement of the piston 156 will continue as long as the control valve 127 is positioned as illustrated in Figs. 15 and 16. When it is desired to park the wiper motor, the vehicle operator will turn the control knob so that the Bowden wire 133 causes the control valve 127 to assume the position illustrated in Fig. 17. In such position of the valve, the control valve hole 136 will be out of alignment with porthole 167, so that compressed air flow to volume 143 and valve chamber 151 will be cut off, while control valve hole 137 will be brought into alignment with porthole 174, thus allowing compressed air to flow from the control valve chamber 121, into the left side of the piston chamber 154, via passageway 176. At the same time, the kidney-shaped groove 180 will bridge porthole 177 and 181, thus exposing the right side of the piston chamber to atmosphere via parking chamber 179, and passageways 178 and 182. The pressure differential thus created between opposite sides of the piston 156, will cause it to be moved into seated engagement with the edge of the parking chamber 179, where it will be held by air pressure which will act initially upon the piston, and subsequently upon the piston washer 209, as air pressure on both sides of the piston is balanced by air leakage occurring past the piston, as heretofore explained.

It is to be noted that during motor parking, the valve disc 162 will be rotationally positioned to establish pneumatic circuits for clockwise movement of the piston when the control valve is again rotated for motor operation. More particularly, the disc valve hole 196 will be in alignment with porthole 187 to allow flow of compressed air into volume 146 when compressed air is introduced into valve chamber 151, and volume 141 will be exposed to atmosphere via passageway 189, porthole 186, groove 197, porthole 184, passageway 188, exhaust chamber 164, and exhaust muffler 166. Hence, when the control valve is rotated for motor operation, the spool valve 138 will be shifted toward the right end of the valve chamber 150, and clockwise movement of the piston 156 will occur, as has been described in connection with the Fig. 16 illustration.

The foregoing description has been given in detail for clearness and without thought of limitation since the inventive principles involved are capable of assuming other physical embodiments without departing from the spirit of the invention and the scope of the appended claims.

What is claimed is:

1. A compressed air operated windshield cleaner comprising a wiper, a fluid motor operatively connected thereto and including automatic valve means operable for driving the motor to move the wiper back and forth in a predetermined path, and other valve means operable to pressurize the motor for parking the wiper beyond its path and thereafter to release the pressure on the motor for relieving the wiper of the motive pressure influence.

2. A windshield cleaner comprising in combination a wiper assembly, a rotatable shaft adapted for the operative support of said wiper assembly, a wiper motor powered by super-atmospheric pressure medium, and a power transmission arranged between the motor and the rotatable shaft, said wiper motor being adapted for driving the wiper assembly through a given arcuate range and for parking the wiper assembly beyond said arcuate range with a release of parking pressure on the wiper assembly, to avoid deformation thereof.

3. A windshield wiper motor powered by a pressurized fluid medium and comprising in combination, motor housing means defining a piston chamber, a rotatable shaft, a piston drivingly connected to the shaft and arranged for reciprocal movement in the piston chamber, said piston having a parked position, a distributing valve adapted upon operation for distribution of pressurized fluid medium to the piston chamber for movement of the piston, means responsive to movement of said shaft to effect operation of the distributing valve, a control valve arranged for admission of pressurized fluid medium to the distributing valve, and means for relieving the fluid pressure on said piston in its parked position.

4. A windshield wiper motor powered by a pressurized pneumatic medium and comprising in combination, motor housing means defining a piston chamber, a rotatable shaft, a piston drivingly connected to the shaft and arranged for oscillatory movement in the piston chamber, a distributing valve adapted upon operation for establishment of pneumatic circuits for conduction of pressurized pneumatic medium through the motor resulting in oscillatory movement of the piston, means responsive to oscillatory movement of said shaft to cause operation of the distributing valve, and a control valve arranged for admission of pressurized pneumatic medium to the distributing valve, said control valve having pneumatic medium acting upon oppositely disposed surfaces to reduce the frictional resistance to movement thereof.

5. A windshield wiper motor powered by compressed air and comprising in combination, motor housing means defining a semicircular piston chamber, a rotatable shaft, a vane-like piston drivingly connected to the shaft and arranged for oscillating movement in the piston chamber, a distributing valve adapted upon operation for establishment of air circuits for conduction of air through the motor resulting in movement of the piston, and a rotatable control valve arranged for admission of compressed air to the distributing valve, said control valve being arranged to have compressed air acting upon oppositely disposed surfaces thereof to reduce the frictional resistance to rotary movement of said control valve.

6. A windshield wiper motor powered by compressed air and comprising in combination, motor housing means defining a semi-circular piston chamber, a rotatable shaft, a vane-like piston drivingly connected to the shaft and arranged for oscillating movement in the piston chamber, a distributing valve chamber having a distributing valve adapted upon operation for establishment of air circuits for conduction of air through the motor resulting in movement of the piston, a sealing cup located at one end of the distributing valve chamber having a flange extending about the edge thereof which is effective to seal the distributing valve chamber against leakage of compressed air, and a rotatable control valve arranged for admission of compressed air to the distributing valve, said control valve being arranged to have compressed air acting upon oppositely disposed surfaces thereof to reduce the frictional resistance to rotary movement of said control valve.

7. A windshield wiper motor powered by compressed air and comprising in combination, motor housing means defining a semi-circular piston chamber, a rotatable shaft, a vane-like piston drivingly connected to the shaft and arranged for oscillatory movement in the piston chamber, motor housing means defining a valve chamber, means including an oscillatory distributing valve adapted for establishment of air circuits for conduction of air through the motor resulting in movement of the piston, means including an arm affixed to the shaft for initiation of oscillatory movement of the distributing valve, and a rotatable control valve arranged for admission of compressed air to the distributing valve, said control valve being arranged for exposure of opposite sides to compressed air to reduce the frictional resistance to rotary movement of said control valve.

8. A windshield wiper motor arranged for connection to a source of compressed air and comprising in combination, motor housing means defining a semi-circular piston chamber, a rotatable shaft passing through the piston chamber and having a transmission connecting means at one end, a piston drivingly connected to the shaft and arranged for oscillatory movement in the piston chamber as a result of fluid pressure differential created between opposite sides of the piston, motor housing means defining a valve chamber, a distributing valve positioned in one part of the valve chamber and adapted for oscillatory movement as a result of pressure differential created between the ends thereof, said movement of the distributing valve being effective to establish pneumatic circuits providing movement of the piston, distributing valve operating means including an arm member affixed to the shaft and a lever rotatably supported by the shaft, said arm member being adapted to move said lever whereby a pressure differential is created between the ends of the distributing valve, and a rotatable control valve arranged for admission of compressed air to the valve chamber.

9. A windshield wiper motor arranged for connection to a source of compressed air and comprising in combination, motor housing means defining a semi-circular piston chamber, a rotatable shaft passing through the piston chamber and having a transmission connecting means at one end, a vane-like piston drivingly connected near one end to the shaft and arranged for oscillatory movement in the piston chamber as a result of fluid pressure differential created between opposite sides of the piston, motor housing means defining a valve chamber, a distributing valve positioned in one part of the valve chamber and movable in response to pressure differential on opposite ends thereof to connect a compressed air passageway alternately to passageways leading to opposite ends of the piston chamber, a lever rotatably mounted upon the shaft for oscillatory movement and being adapted upon movement to cause a pressure differential on opposite ends of the distributing valve, an arm member affixed to the shaft and adapted to provide movement of the lever, means including an integral control valve rotatable to a first position providing air flow into the motor to effect oscillation of the piston, said control valve being rotatable to a second position to effect parking of the piston and to a third position relieving the pressure differential on the piston when it is parked, and means to automatically rotate the control valve from said third position to said second position.

10. In a windshield wiper motor arranged for connection to a source of compressed air and having a piston chamber, a shaft passing through the piston chamber, and a piston drivingly connected to the shaft, the combination including a distributing valve movable in response to pressure differential to establish air circuits for reciprocating movement of the piston, a rotatable control valve movable to a first position for supply of compressed air to said distributing valve to provide piston oscillatory movement, said control valve being movable to a second position to effect piston parking movement and to a third position relieving pressure on the piston when it is in parked condition, and means to automatically rotate the control valve from said third position to said second position.

11. In a windshield wiper motor arranged for connection to a source of compressed air and having a semi-circular piston chamber, a shaft passing through the piston chamber, and a piston drivingly connected to the shaft, the combination including a reciprocable distributing valve responsive to pressure differential alternately created on opposite ends thereof to move the valve to establish air circuits for movement of the piston, a rotatable control valve operatively associated with said distributing valve to provide piston oscillatory movement when said control valve is in one position, said control valve being movable to a second position to provide piston parking movement and to a third position relieving pressure on the piston when it is in parked condition, and means to automatically rotate the control valve from its third position to its second position, said control valve having compressed air acting on oppositely disposed areas thereof to reduce frictional resistance to rotation.

12. In a windshield wiper motor arranged for connection to a source of compressed air and having a piston chamber, a shaft passing through the piston chamber, and a piston drivingly connected to the shaft, the combination including a distributing valve movable in response to pressure differential to establish air circuits for movement of the piston, a valve operatively associated with the shaft and adapted upon operation for establishment of pressure differential on said distributing valve as the shaft approaches the end of its rotary movement in each direction, a rotatable control valve operative in one position for supply of compressed air to said distributing valve to provide piston oscillatory movement, said control valve being movable to a second position to provide piston parking movement and to a third position relieving pressure on the piston in its parked condition, and means to automatically rotate the control valve from said third position to said second position.

13. In a windshield wiper motor arranged for connection to a source of compressed air and having a semi-circular piston chamber, a shaft passing through the piston chamber, and a piston drivingly connected to the shaft, the combination including a reciprocable distributing valve responsive to pressure differential alternately created on opposite ends thereof to move the valve to establish air circuits for movement of the piston, a valve operatively associated with the shaft and adapted upon operation for establishment of pressure differential on said distributing valve as the shaft approaches the end of its rotary movement in each direction, a rotatable control valve operatively associated with said distributing valve to provide piston oscillatory movement, to control valve being movable to a second position to provide piston parking movement and to a third position to relieve pressure on the piston in its parked condition, and means to automatically rotate the control valve from said third position to said second position, said control valve having compressed air acting on oppositely disposed areas thereof to reduce frictional resistance to rotation.

14. A windshield wiper motor arranged for connection to a source of compressed air and comprising in combination, motor housing means defining a piston chamber, a rotatable shaft passing through the chamber, a piston drivingly connected to the shaft and movable in the chamber in response to pressure differential created between opposite sides thereof, motor housing means defining a valve chamber, an oscillatory valve means in the valve chamber, a shiftable valve means adapted for establishing a pressure differential alternately on opposite sides of the piston, said oscillatory valve means movable for distribution of compressed air to the shiftable valve means to shift the latter, an arm member affixed to the shaft adapted for movement of the oscillatory valve means, and a control valve adapted for admission of compressed air to the shiftable valve means, said control valve being arranged for exposure of opposite sides to compressed air to reduce the frictional resistance to movement thereof.

15. A windshield wiper motor arranged for connection to a source of compressed air and comprising in combination, motor housing means defining a semi-circular piston chamber, a rotatable shaft passing through the chamber, a piston drivingly connected to the shaft and movable in the chamber in response to pressure differential created between opposite sides thereof, motor housing means defining a valve chamber, an oscillatory valve means in the valve chamber mounted for pivotal movement upon the shaft, a reciprocable valve adapted upon operation for establishment of a pressure differential acting alternately on opposite sides of the piston, said oscillatory valve means movable for completion of circuits for conduction of compressed air to the reciprocable valve for operation thereof, an arm member affixed to the shaft and adapted for movement of the oscillatory valve means, and a rotatable control valve adapted for admission of compressed air to the reciprocable valve and from the reciprocable valve to the piston chamber, said control valve being arranged for exposure of opposite sides thereof to compressed air to reduce frictional resistance to rotary movement thereof.

16. In a windshield wiper motor powered by compressed air and having a piston chamber, a rotatable shaft extending through the chamber, and a piston arranged for movement in the piston chamber and drivingly connected to the shaft, the combination including a rotatable control valve having compressed air exerted on opposite sides thereof to reduce rotational friction, a reciprocable valve arranged upon operation for distribution of compressed air from the control valve for movement of the piston, a rotatable valve operable to direct compressed air for operation of the reciprocable valve, and an arm driven by the shaft for operation of the rotatable valve, said control valve adapted in a first position to cooperate in the establishment of a pressure differential between opposite sides of the piston for movement thereof, and adapted in a second position to admit compressed air to only one side of the piston chamber resulting in piston parking.

17. In a windshield wiper motor powered by compressed air including a semi-circular piston chamber with a parking chamber arranged therein, a rotatable shaft extending through the piston chamber, and a piston arranged for oscillatory movement in the piston chamber and drivingly connected to the shaft, the combination including a rotatable control valve having opposite surfaces exposed to compressed air to reduce rotational friction, a reciprocable valve arranged in a valve chamber and operable for distribution of compressed air alternately to opposite ends of the motor chamber, a rotatable valve pivotally supported on the shaft and operable to direct compressed air alternately to opposite ends of the reciprocable valve chamber for movement of the reciprocable valve, an arm affixed to the shaft adapted for operation of the rotatable valve, and holding means affixed to one side of the piston which is responsive to compressed air escaping past the edges of the piston to hold the piston against the parking chamber, said control valve adapted in a first position to cooperate in the establishment of a pressure differential alternately between opposite sides of the piston to provide oscillatory movement thereof, and adapted in a second position to admit compressed air to the piston chamber on the side of the piston opposite the holding means thereby resulting in piston parking.

18. In a windshield wiper motor powered by compressed air including a semi-circular piston chamber with a parking chamber arranged therein, a rotatable shaft extending through the piston chamber, and a piston arranged for oscillatory movement in the piston chamber and drivingly connected to the shaft, the combination including a rotatable control valve having opposite surfaces exposed to compressed air to reduce rotational friction, a reciprocable valve arranged in a valve chamber and operable for distribution of compressed air alternately to opposite ends of the motor chamber, a rotatable valve pivotally supported on the shaft and operable to direct compressed air alternately to opposite ends of the reciprocable valve chamber for movement of the reciprocable valve, an arm affixed to the shaft adapted for operation of the rotatable valve, and holding means in the form of a flexible washer affixed to one side of the piston which is responsive to compressed air escaping past the edges of the piston to be tightly held against the edges of the parking chamber to hold the piston in parked position, said control valve adapted in a first position to cooperate in the establishment of a pressure differential alternately between opposite sides of the piston to provide oscillatory movement thereof, and adapted in a second position to admit compressed air to the piston chamber on the side of the piston opposite the holding means thereby resulting in piston parking.

References Cited in the file of this patent

UNITED STATES PATENTS

| | | |
|---|---|---|
| 1,458,355 | Nelson | June 12, 1923 |
| 2,011,029 | Barnwell | Aug. 13, 1935 |
| 2,404,747 | Sacchini | July 23, 1951 |
| 2,572,750 | Oishei | Oct. 23, 1951 |
| 2,593,626 | Stoltenberg | Apr. 22, 1952 |
| 2,752,894 | Tomlin | July 3, 1956 |